United States Patent [19]

Wash et al.

[11] Patent Number: 5,017,326

[45] Date of Patent: May 21, 1991

[54] FILM MID ROLL INTERRUPT PROTECTION FOR A CAMERA USING MAGNETIC AZIMUTH RECORDING ON FILM

[75] Inventors: Michael L. Wash, Pittsford; Douglas H. Pearson, Rochester; Richard R. Kelbe, Fishers, all of N.Y.

[73] Assignee: Eastman Kodak Company, Rochester, N.Y.

[21] Appl. No.: 417,345

[22] Filed: Oct. 5, 1989

[51] Int. Cl.$^5$ .............................................. G03B 17/24
[52] U.S. Cl. ........................................ 354/207; 354/76; 354/106
[58] Field of Search ............ 354/105, 106, 109, 173.1, 354/207, 214, 76, 21; 352/92, 236; 355/40; 360/1, 2, 3, 104, 105, 109

[56] References Cited

U.S. PATENT DOCUMENTS

| | | | |
|---|---|---|---|
| 4,270,854 | 6/1981 | Stemme et al. | 354/76 |
| 4,864,332 | 9/1989 | Harvey | 354/173.1 X |
| 4,878,075 | 10/1989 | Cannon | 354/106 |
| 4,905,029 | 2/1990 | Kelly | 354/76 |

Primary Examiner—A. A. Mathews

[57] ABSTRACT

Data is recorded on the film by the manufacturer prior to exposure at a first magnetic head azimuth angle. The camera magnetically records information on the film frame-by-frame at a second head azimuth angle with each exposure or shortly thereafter. Before exposure of any frame, the camera determines whether the frame has already been exposed by sensing the recorded signal amplitude at one of the two magnetic head azimuth angles. In order to prevent a double exposure, the camera transports the film past any frame having data magnetically recorded therein corresponding to the second azimuth angle.

13 Claims, 1 Drawing Sheet

FILM MID ROLL INTERRUPT PROTECTION FOR A CAMERA USING MAGNETIC AZIMUTH RECORDING ON FILM

CROSS REFERENCE TO RELATED APPLICATIONS

This application contains subject matter related to subject matter described in U.S Pat. Application Ser. No. 417,347 filed on Oct. 5, 1989 by Jeffrey R. Stoneham and Patricia D. Fairman, entitled "Camera Apparatus for Magnetically Recording on Film" and U.S. Pat. Application Ser. No. 255,693 filed Oct. 7, 1988 by Robert Cloutier et al., entitled "Film Information Exchange System Using Dedicated Magnetic Tracks on Film", both applications being assigned to the present assignee.

BACKGROUND OF THE INVENTION

The problem of film cameras creating double exposures is a familiar one. After reinserting partially exposed film back into a camera. There is a need for a simple, reliable and inexpensive way of preventing a camera from creating double exposures, particularly when the film is reloaded after prior exposures have caused the film to be wound to near mid-roll.

Magnetically recording data on film by the film manufacturer, the camera, the customer order station and the photofinisher is described in the above-referenced patent application by Cloutier et al. Typically, using the ability to magnetically record data on the film to provide mid-roll interrupt protection (i.e., to prevent the camera from double exposing the film) has required the camera to be able to interpret the recorded data. The disadvantage is that interpreting the data is an elaborate task, as described in the above-referenced Cloutier application. As such, a mid-roll interrupt protection system in a camera which reads and interprets the magnetically recorded data must be disadvantageously elaborate. Moreover, it is not possible to provide such a system in those cameras not having the ability to read and interpret magnetically recorded data.

Accordingly, it is the object of the present invention to provide a mid-roll interrupt protection system in a camera which is simple and inexpensive and does not require that the camera to read, decode or interpret data magnetically recorded on the film in order to prevent double exposures.

SUMMARY OF THE INVENTION

The invention is a mid-roll interrupt protection system in a camera having a magnetic head (or heads) which can sense magnetic signals recorded on film loaded in the camera. In accordance with one embodiment of the invention, whenever a particular frame on the film is exposed by the camera, a controller on board the camera causes the magnetic head to record a predetermined signal at a first magnetic head azimuth angle. Whenever a particular frame on the film is to be exposed by the camera, the controller first causes that frame to be scanned by the head at the first azimuth angle to determine whether data has been previously recorded in that frame at the first azimuth angle. If so, the controller prevents exposure of that frame —by winding the film to the next frame, for example.

In another embodiment of the invention particularly suitable for use in inexpensive cameras, a signal is magnetically recorded at a first azimuth angle in all frames in the film prior exposure in the camera. Each time the camera exposes a particular frame, it magnetically erases the prerecorded signal. A stationary magnetic head oriented at the first azimuth angle with respect to the film in the camera scans each film frame prior to the exposure of that frame. If simple electronics connected to the head sense a head playback signal above a certain threshold magnitude, then that frame is deemed not to have been exposed. Otherwise, in the absence of a playback signal of sufficient magnitude, the particular frame is deemed to have been previously exposed and magnetically erased by the camera, and a warning is issued to the camera user. (Alternatively, exposure of that frame may be automatically prevented.)

In the preferred embodiment of the invention, the camera itself records data in each film frame with the exposure thereof, such data uniquely pertaining to information regarding the particular frame in which it is recorded. Such camera-recorded data is recorded at a second head azimuth angle. The camera only employs film having data pre-recorded in each frame thereof at a first head azimuth angle. The camera can move its magnetic head, in sequence, to the first and second azimuth angles to (1) sense whether the pre-recorded signal (of the first head azimuth angle) has been erased in a particular frame by virtue of that frame having been previously exposed and (2) to record (at the second azimuth angle) scene-related information in that frame with the exposure thereof. In this preferred embodiment, if the camera first senses the presence of data magnetically recorded in the current film frame at the first azimuth angle, it automatically searches for the next frame in which no such data is present.

DETAILED DESCRIPTION OF THE INVENTION

Figure 1:
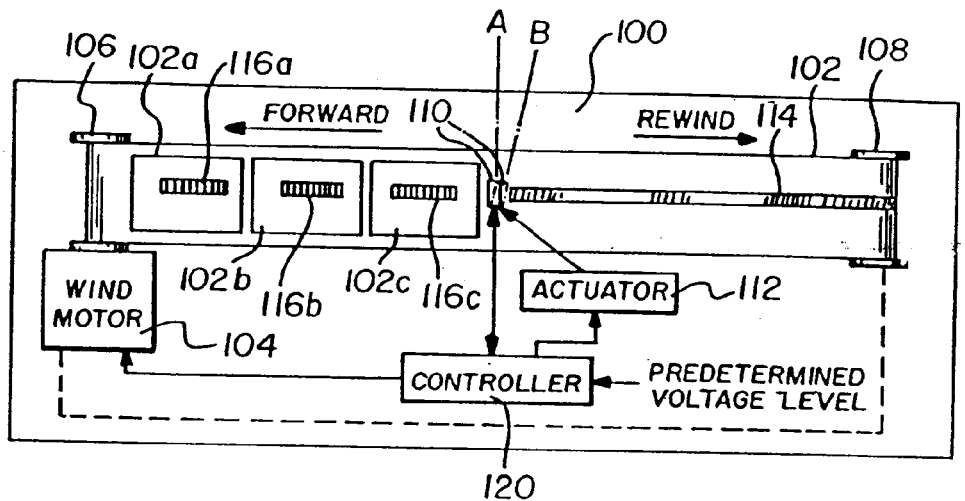
FIG. 1 is a pictorial diagram of a camera embodying the present invention, illustrating the magnetic recording of signals on film in the camera.

Referring now to FIG. 1, a camera 100 transports a roll of film 102 by a transport motor 104 rotating two reels 106, 108 around which the film 102 is wound. The film 102 includes a magnetic layer in which signals or data may be magnetically recorded. The camera includes a magnetic head 110 which is rotatable between two head azimuth angles A and B. Such head rotation and apparatus for accomplishing it is disclosed in the above-referenced patent application by Jeffrey R. Stoneham et al. A magnetic track 114 containing a signal or data of a predetermined nature and which was pre-recorded at the head azimuth angle B extends along the length of the film 102. The track 114 may be pre-recorded either by the film manufacturer or other entity prior to the film being loaded into the camera, or may be recorded by the camera head 110 by winding the entire length of film between the two reels 104 and 106 when the film is first loaded into the camera. Winding the entire length of the film through the camera 100 is ordinarily performed in many cameras in a so-called "pre-wind" operation.

When the camera is ready to operate, the head 110 is rotated to the azimuth angle A. As each film frame 102a, 102b, 102c, etc., is exposed by the camera 100, the head 110 erases the track 114 and records scene information (or a simple predetermined signal) in individual tracks 116a, 116b, 116c, etc., in the respective frames 102a, 102b, 102c, etc.

However, prior to the exposure of the film a controller 120 in the camera 100 causes the head 110 to scan the film (e.g., by activating the transport motor 104) while the head is oriented at the first azimuth angle A, and monitors the amplitude of the playback signal from the head 110. If the amplitude is above a pre-determined threshold, this means that scene-related data is present on the film and therefore it has been previously exposed. Accordingly, the controller 120 causes the transport motor 104 to wind the film until the head no longer provides a playback signal exceeding the predetermined threshold magnitude. As soon as the absence of such a playback signal is detected by the controller 120, it stops the transport motor. The film frame now located adjacent the head 110 has never been exposed by the camera. As a double check, the controller 120 can then rotate the head to the second azimuth angle B and make sure that the pre-recorded track 114 is still present in the film frame selected to be exposed (now located under the head 110). In either case, the controller 120 can now permit the camera 100 to operated as usual and sequentially expose the rest of the frames on the film 102. With each such exposure, the controller causes the head 110 to be oriented in the first azimuth angle A and to record scene-related information (or simply a predetermined signal) in the new tracks 116a, 116b, etc. in the subsequent frames.

Figure 2:
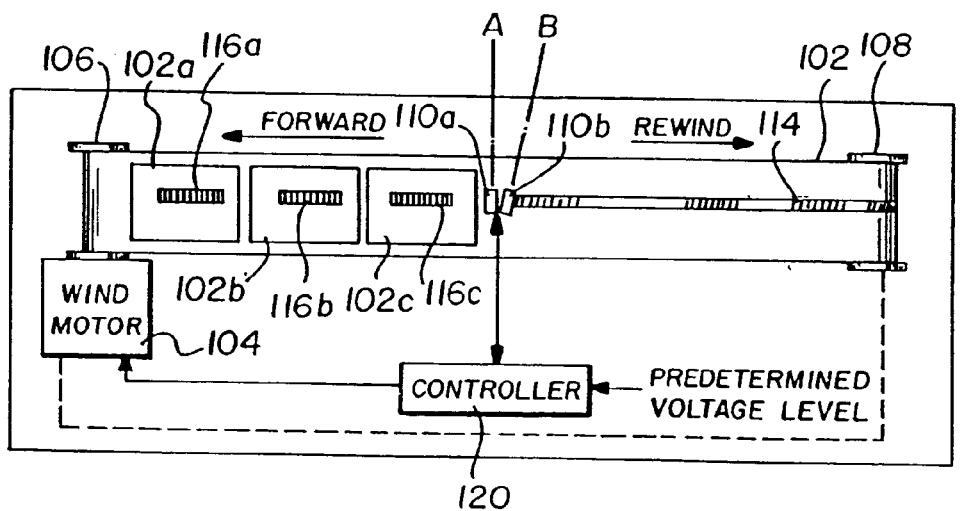
FIG. 2 is a pictorial diagram of a camera embodying an alternative embodiment of the present invention, illustrating the magnetic recording of signals on film in the camera.

In an alternative embodiment of the invention, as shown in FIG. 2, the actuator 112 is eliminated in favor of two heads 110a and 110b oriented at the respective azimuth angles A and B. Instead of rotating a single head to the required azimuth angle, in this alternative embodiment the controller selects either one or the other of the two heads 110a, 110b for recording or playback as appropriate in accordance with the foregoing description.

In yet another alternative embodiment of the invention, the head 110 is simply employed by the controller 120 as an erase head and as a playback head. As each frame 102a, 102b, etc. is exposed by the camera 100, the head 110 erases that portion of the pre-recorded track 114 lying within the current frame. Mid-roll interrupt protection is accomplished in this embodiment by the head 110 being oriented at the azimuth angle B of the pre-recorded track 114 and scanning the film 102 prior to camera operation. Such scanning may occur, for example, during film prewind in those cameras which normally prewind the film as a necessary prelude to taking pictures. (Alternatively, each individual film frame may be magnetically scanned prior to its being exposed.) During such scanning, the playback signal amplitude from the head 110 is monitored by the controller 120. If this amplitude falls below a predetermined threshold level, the controller issues an error signal signifying that the current frame has been previously exposed. Such an error signal may command the transport motor to continue winding the film 102 until the magnetic head playback signal is no longer below the predetermined threshold, signifying that an unexposed section of the film has finally been located, and that normal camera operation may commence.

As is well-known in the art, the azimuth angles A and B of the head 110 are simply the angle between the elongate magnetic gap in the head 110 and the perpendicular to the direction of the magnetic media (film) travel. As long as the azimuth angles A and B differ from each other by about 8.5 degrees, there is a distinct and pronounced difference between the playback signal amplitude generated by the head reading data recorded at either one of the two angles. The maximum amplitude is obtained whenever the azimuth angle of the recording and playback heads are the same. Thus, the controller 120 can differentiate between signals recorded at different azimuth angles by simply employing a differential amplifier which compares the average playback signal amplitude from the head 110 with a pre-set voltage level.

While the invention has been described in detail by specific reference to preferred embodiments thereof, it is understood variations and modifications thereof may be made without departing from the true spirit and scope of the invention.

What is claimed is:

1. In a photographic camera employing film having a magnetic layer for magnetically recording information in said film and which exposes successive frames in said film, a double exposure protection system comprising:
   means for magnetically pre-recording a signal on said film characterized by a first magnetic head azimuth angle and for detectably altering the signal so recorded in each of said film frames upon its being exposed by said camera; and
   means for sensing whether said recorded signal has been altered in a particular one of said frames prior to the exposure thereof and preventing a double exposure of said frame in response said signal being altered.

2. The system of claim 1 wherein said means for magnetically recording detectably alters said recorded signal by recording over it a second signal within or adjacent the film frame exposed by said camera at a second magnetic head azimuth angle different from said first azimuth angle.

3. The system of claim 1 wherein said means for magnetically recording detectably alters said recorded signal by erasing it within said one frame.

4. The system of claim 2 wherein said second signal comprises scene-related data corresponding to said frame.

5. The system of claim 1 wherein said means for preventing a double exposure comprise means for transporting said film past said means for sensing as long as said means for sensing senses that said recorded signal is altered and until a film frame is found for which said sensing means does not sense that said recorded signal has been altered.

6. In a photographic camera employing film having a magnetic layer for magnetically recording information in said film and which exposes successive frames in said film, said film having a signal magnetically prerecorded therein at a first magnetic head azimuth angle, a double exposure protection system comprising:
   means for detectably altering other than by erasing the signal pre-recorded within each one of said film frames upon its being exposed by said camera; and
   means for sensing whether said pre-recorded signal has been altered in a particular one of said frames prior to the exposure thereof and preventing a double exposure of said frame in response said signal being altered.

7. The system of claim 6 wherein said means for altering alters said pre-recorded signal by recording over it a second signal within the film frame exposed by said camera at a second magnetic head azimuth angle different from said first azimuth angle.

8. The system of claim 7 wherein said second signal comprises scene-related data corresponding to said one frame.

9. The system of claim 6 wherein said means for preventing a double exposure comprise means for transporting said film past said means for sensing as long as said means for sensing senses that said recorded signal is altered and until a film frame is found for which said sensing means does not sense that said recorded signal has been altered.

10. The system of claim 6 wherein said means for altering and said means together comprise common magnetic head means characterized by said first and second azimuth angles.

11. The system of claim 10 wherein said magnetic head means comprises a magnetic head having a single gap and an actuator for moving said head so as to orient said gap at either one of said first and second azimuth angles.

12. The system of claim 10 wherein said magnetic head means comprises two heads having magnetic head gaps permanently oriented, respectively, at said first and second azimuth angles.

13. The system of claim 6 wherein said means for sensing compares an average magnetic playback signal level with a predetermined voltage level.

* * * * *

UNITED STATES PATENT AND TRADEMARK OFFICE
CERTIFICATE OF CORRECTION

PATENT NO. : 5,017,326
DATED : May 21, 1991
INVENTOR(S) : Michael L. Wash et al.

It is certified that error appears in the above-identified patent and that said Letters Patent is hereby corrected as shown below:

<u>Title page,</u>
Insert figure 1 from attached drawing sheet

<u>Drawings,</u>
Insert figures 1 and 2 from attached drawing sheet

Signed and Sealed this

Twenty-second Day of July, 2003

JAMES E. ROGAN
*Director of the United States Patent and Trademark Office*